United States Patent
Hodge

(10) Patent No.: US 10,616,404 B2
(45) Date of Patent: *Apr. 7, 2020

(54) SYSTEM AND METHOD FOR COMMUNICATING WITH INMATES IN A PRIVILEGED COMMUNICATION

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/357,849

(22) Filed: Mar. 19, 2019

(65) Prior Publication Data

US 2019/0215323 A1    Jul. 11, 2019

Related U.S. Application Data

(63) Continuation of application No. 15/822,832, filed on Nov. 27, 2017, now Pat. No. 10,237,273, which is a continuation of application No. 15/620,322, filed on Jun. 12, 2017, now Pat. No. 9,832,202, which is a continuation of application No. 15/354,417, filed on Nov. 17, 2016, now Pat. No. 9,680,838.

(51) Int. Cl.
*H04M 3/22* (2006.01)
*H04L 29/06* (2006.01)

(52) U.S. Cl.
CPC ........ *H04M 3/2281* (2013.01); *H04L 63/306* (2013.01); *H04L 65/1069* (2013.01)

(58) Field of Classification Search
CPC ................ H04M 3/2281; H04M 3/38; H04M 2203/6081; H04M 3/42102; H04L 65/1069; H04L 63/306; H04L 65/1073; H04L 65/1076; H04L 63/102; H04L 63/08

See application file for complete search history.

(56) References Cited

U.S. PATENT DOCUMENTS

| | | | |
|---|---|---|---|
| 4,965,819 A | 10/1990 | Kannes | |
| 7,061,521 B2* | 6/2006 | Bulriss | H04N 7/147 348/14.08 |
| 9,030,292 B2* | 5/2015 | Torgersrud | G06F 21/32 340/5.53 |

(Continued)

OTHER PUBLICATIONS

Non-Final Office Action directed to U.S. Appl. No. 15/354,417, dated Feb. 16, 2017; 12 pages.

(Continued)

*Primary Examiner* — Theodore C Parsons
*Assistant Examiner* — Thomas Ho
(74) *Attorney, Agent, or Firm* — Sterne, Kessler, Goldstein & Fox P.L.L.C.

(57) ABSTRACT

A system and method for with an inmate in a privileged communication are disclosed. a communication system includes a portal subsystem that determines whether a communication should be monitored, or not, based on received information, including access information, from a first communication device. Based on the determination, the communication system bypasses a monitoring subsystem and stores and/or transmits the communication to a second communication device by way of a non-monitoring subsystem.

20 Claims, 7 Drawing Sheets

(56) References Cited

U.S. PATENT DOCUMENTS

| | | | |
|---|---|---|---|
| 9,094,569 B1 * | 7/2015 | Humphries | H04N 7/14 |
| 9,344,390 B1 * | 5/2016 | Chandrasekar | G06F 16/38 |
| 9,680,838 B1 | 6/2017 | Hodge | |
| 9,680,878 B2 * | 6/2017 | Hodge | H04L 51/066 |
| 9,832,202 B1 * | 11/2017 | Hodge | H04L 63/102 |
| 10,237,273 B2 | 3/2019 | Hodge | |
| 2005/0128283 A1 | 6/2005 | Bulriss et al. | |
| 2006/0212303 A1 | 9/2006 | James et al. | |
| 2012/0262271 A1 | 10/2012 | Torgersrud et al. | |
| 2013/0194377 A1 | 8/2013 | Humphries | |
| 2014/0020063 A1 | 1/2014 | Hodge et al. | |

OTHER PUBLICATIONS

Notice of Allowance directed to U.S. Appl. No. 15/354,417, dated Apr. 18, 2017; 14 pages.

Notice of Allowance directed to U.S. Appl. No. 15/620,322, dated Sep. 8, 2017; 10 pages.

International Search Report and Written Opinion of the International Searching Authority directed to related International Patent Application No. PCT/US2017/061917, dated Dec. 14, 2017; 7 pages.

* cited by examiner

SYSTEM AND METHOD FOR COMMUNICATING WITH INMATES IN A PRIVILEGED COMMUNICATION

CROSS-REFERENCE TO RELATED APPLICATIONS

This application is a continuation of U.S. patent application Ser. No. 15/822,832 filed on Nov. 27, 2017, which is a continuation of U.S. patent application Ser. No. 15/620,322 filed on Jun. 12, 2017, which is a continuation of U.S. patent application Ser. No. 15/354,417 filed on Nov. 17, 2016, all of which are incorporated by reference herein in their entirety.

BACKGROUND

Field

The disclosure relates to a communication system that facilitates access to a secure portal for privileged communications to/from inmates in a correctional facility.

Background

Correctional facilities provide inmates with the ability to communicate with others by way of phone, video communication, email, or text. In general, inmates have a diminished right to privacy such that these communications are monitored. However, certain communications, including those with investigators, attorneys, and doctors, should not be monitored because the communications are either covered under privacy rights or, if made public, could endanger inmates or others.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
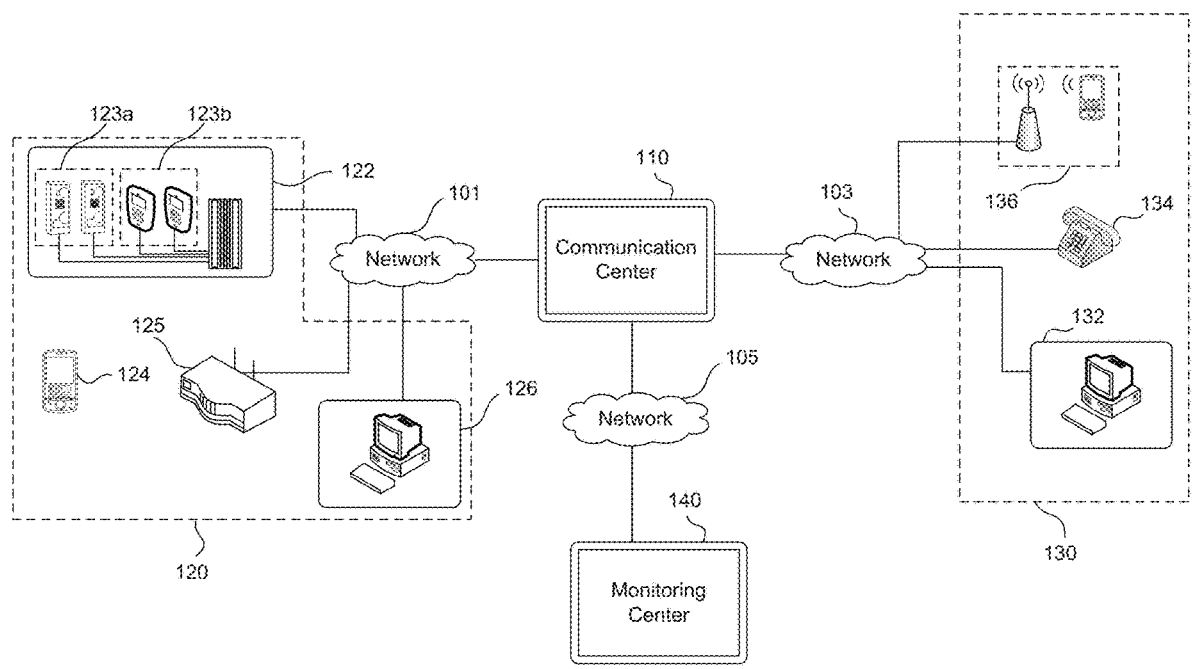
FIG. 1 illustrates a block diagram of a communication system, according to exemplary embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

In general, communications between an inmate and others are recorded and monitored because inmates have limited privacy rights. Certain communications, however, are covered under privacy rights for everyone, including inmates. For example, communications with attorneys, doctors, investigators, counselors, and other non-inmate professionals are covered under privacy rights. For these types of communications, correctional facilities are not allowed to monitor the communications. Additionally, some communications, including those with an investigator at times when the inmate is acting as an informant, should not be monitored due to safety reasons for inmates and others.

Over the years, communication systems for correctional facilities have evolved from merely facilitating phone calls to facilitating communications by way of audio, video, email, or texting technologies. As more options for communications have increased, so has the complexity in the technologies managing and controlling the communications. However, conventional communication systems have mostly remained the same in the area of determining whether a communication is privileged. To do this, conventional systems merely flag a phone number as being authorized to be involved in a privileged communication (i.e., a non-monitored communication). Thus, conventional systems use the same communication system for both privileged and non-privileged communications. Use of a single communication system for both privileged and non-privileged communications has led to some privileged communications having been recorded, monitored, and/or disclosed to the public. Examples of this issue include attorney-client conversations, medical records, and informant hotline communications being disclosed to the public. Disclosure of these communications not only violate inmate privacy rights but can lead to inmates being in danger based on the communication, especially in the case of informant hotline communications. Additionally, disclosure of the communications may lead to lengthy and costly law suits against companies that provide the communication systems, and correctional facilities and jurisdictions that use the communication systems.

In light of the above, the present disclosure provides a communication system and method for communicating with an inmate in a privileged communication. The communication system includes a portal subsystem that determines whether a communication should be monitored, or not, based on received information, including access information, from a first communication device. By receiving the information, the communication system bypasses a monitoring subsystem and stores or transmits the communication to a second communication device by way of a non-monitoring subsystem.

Communication System

FIG. 1 illustrates a block diagram of a communication system 100, according to exemplary embodiments of the present disclosure. The communication system 100 includes a communication center 110 configured to receive and transmit communications between an inmate communication device 120 and an outsider communication device 130. In this disclosure, a communication refers to both real time and non-real time communications. The communication is for example, an audio communication, a video communication, an email, or a text between an inmate using the inmate communication device 120 and an outsider using the outsider communication device 130.

The inmate communication device 120 includes any or all devices such as wired communication devices 122, which include audio communication devices 123a and video communications devices 123b, wireless communication device 125, and/or a control station 126. The communication center 120 also connects to a wireless access point 125 (e.g., a router), which may provide connectivity to the wireless devices 124. The inmate communication devices 120, such as the video communications devices 123b, the wireless communication device 125, and/or the control station 126, are configured to include a camera and a screen for generating and viewing videos or images. The inmate communication device 120 connects to the communication center 110 via a network 101. The network 101 includes a Local-Area Network (LAN), a Wide-Area Network (WAN), or the Internet, depending on the relative locations of the communication center 110 and the inmate communication device 120. For example, the communication center 110 may be located at a correctional facility where the inmate communication device 120 is located and therefore a LAN is used. In another example, the communication center 110 is located at a different location than the correctional facility and therefore the network 101 is a WAN or the Internet.

The outsider communication device 130 includes any and all devices such as a work station 132, a basic telephone 134, and/or a wireless communication device 136. The outsider communication device 130 is configured to include one or more of a microphone and speaker for generating and receiving audio, a camera and a video screen for generating and viewing video, and/or a texting application such as an email client or a texting app. The outsider communication device 130 connects to the communication center 110 via network 103, which may include any or all of a WAN, the Internet, and/or a Public Switched Telephone Network (PSTN). In an embodiment, WebRTC may be utilized in place of a session initiation protocol (SIP) over a WAN or the Internet, each of which provides a dedicated, privileged link between the inmate communication device 120 and the outsider communication device 130. The WAN is used to provide access to control stations or clients such as the work station 132, that are located within the WAN. The Internet is utilized to provide access to communication devices such as remotely distributed control stations (e.g., the work station 132). The PSTN can be used to provide connectivity to the basic telephone 134 and/or the wireless communication device 136 and other communication devices (not shown) over traditional data networks.

The communication system 100 also includes a monitoring center 140 configured to receive communications and data from the communication center 110. The monitoring center 140 receives the communications and data so as to facilitate the monitoring of the communications both automatically and manually by a reviewer. The monitoring center 140 connects to the communication center 110 via a network 105. The network 105 includes a LAN, a WAN, or the Internet, depending on the relative locations of the communication center 110 and the monitoring center 140.

Communication Center

Figure 2:
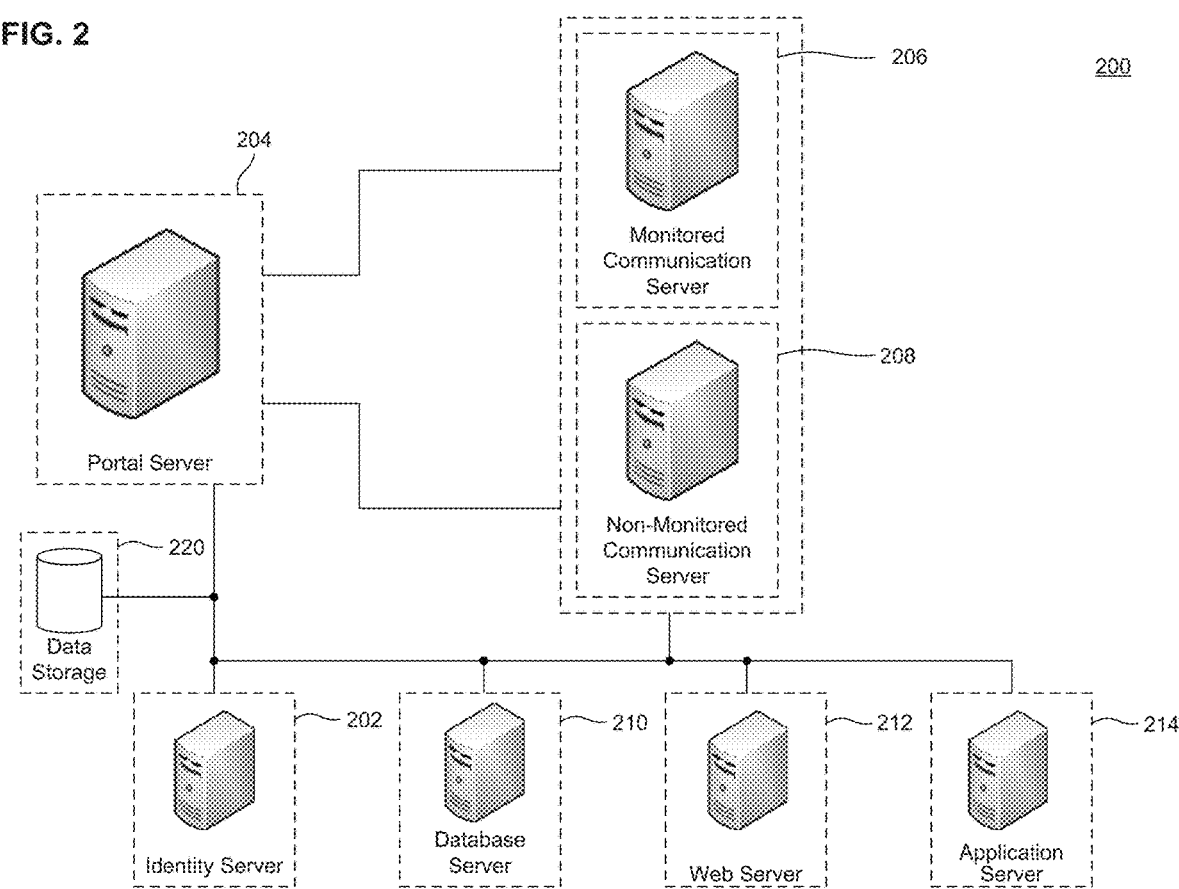
FIG. 2 illustrates a block diagram of a communication center, according to exemplary embodiments of the present disclosure.

FIG. 2 illustrates a block diagram of a communication center 200, according to exemplary embodiments of the present disclosure. The communication center 200 may represent an exemplary embodiment of the communication center 110 of FIG. 1. The communication center 200 includes an identity server 202, a portal server 204, a monitoring communication server 206, a non-monitoring communication server 208, a database server 210, a web server 212, an application server 214, and data storage 220.

Each of the servers 202-212 can be constructed as individual physical hardware devices, or as virtual servers. The number of physical hardware machines can be scaled to match the number of simultaneous user connections desired to be supported in the communication system 100.

The identity server 202 consists of any number of servers, and is configured to collect and store identity data of inmates and outsiders authorized to access the communication system 100. Identity data includes at least one of username and password data, challenge questions, challenge answers, voice data, fingerprint data, retinal data, facial recognition data (2D or 3D), device data such as make and model of a communication device, and/or location data. The challenge question form of identity data may be a series of challenge questions, or a single challenge question such as the last four digits of an inmate's social security number, mother's maiden name, and the like. The identity server 202 is further configured to facilitate a secure communication between parties receiving/transmitting a communication by performing identity verifications to authenticate identities of purported parties. The identity verification includes logon verifications, such as username and password verifications, biometric verifications, such as voice recognition, challenge questions, challenge answers, fingerprint recognition, retinal recognition, facial recognition (2D or 3D), device verification, and/or location verification. The identity server 202 performs an identity verification by receiving identity information such as one or more of a username and password, a response to a challenge question(s), a voice sample, a fingerprint sample, a retinal sample, a facial image (2D or 3D), device information such as a make and model of the communication device, and/or a location of the communication device, from a communication device (either 120 or 130) used by a purported party and comparing the identity information of the purported party with stored identity data.

The portal server 204 consists of any number of servers, and is configured to determine whether a communication should be routed through the monitoring server 206 or the non-monitoring server 208. The portal server 204 receives access information from a communication device (either 120 or 130) to determine whether to monitor the communication. The access information includes an email address, a phone number, an audible request, a predetermined number, a personal identification number (PIN), and/or a selection from an interface, to provide some examples. Received access information is compared against access data, as explained below. In an embodiment, the access information is used by the portal server 204 to determine the initiating party and/or the receiving party of the communication.

The portal server 204 is also configured to collect and store portal data. The portal data includes access data that indicates whether a user a communication is authorized to be routed to the non-monitoring server 208. For example, when access information is received from a communication device 120 or 130, the portal server 204 compares the access information to the portal data to determine whether a communication is authorized to be routed by way of the non-monitored communication server 208. Examples of access data may include an email address, a phone number, an audible command, a predetermined number, a PIN, and/or an interface button for selection that are associated with an initiating party and/or a receiving party. Portal data also includes account data indicating which users have an account and with whom the users may communicate with through the non-monitored communication server 208.

In an embodiment, the portal server 204 may require a multi-step access process to determine whether a user is authorized to have a privileged (i.e., non-monitored) communication with a receiving party of the privileged communication. For example, the portal server 204 can receive first access information and prompt the user for second access information. In detail, after the portal server 204 receives first access information (e.g., a phone number or an email address) the portal determines whether the first access information is associated with a person authorized for privileged communications (e.g., a lawyer, doctor, etc.). If additional information is needed, the portal server 204 can then request for second access information such as a PIN, a voice prompt, a second phone number, or a selection on an interface. The second access information is used to confirm that the user wants to have a privileged communication, to determine that the user is authorized to have a privileged communication with the receiving party, and/or to determine an identity of the receiving party. In an embodiment, the first or second access information may be based on identity information received through an identity verification.

In an embodiment, the portal server 204 is configured to transmit, or instruct the application server 212 or another server to transmit, an audible, visual, or text notification to a user that a communication will be routed by way of the monitoring communication server 206 or non-monitoring communication server 208. For non-real time communications such as texts or emails, the confirmation may be pop-up window on an interface, or a reply text or email that indicates which of the communication servers 206 or 208 will route the communication. The notification can include information for the user to end or delete the communication if indicated that an undesired communication server will route the communication. For example, the portal server 204 can send a notification to a user, by way of, for example, a text, indicating that that the user's message, such as a text, will be routed through the monitored communication server 206 and can prompt the user to select whether the user wants to in fact have the communication routed by way of the monitored communication server 206.

The monitored communication server 206 consists of any number of servers, and is configured to control the routing of communications to an end destination and to the monitoring center 140. In doing so, the monitored communication server 206 performs switching required to electrically connect to a party, when receiving communications, connect to another party, when transmitting communications, and connect to the monitoring center 140. Further, the monitored communication server 206 is configured to log communication information, including time of communication and parties involved in communication, and store the logs and communications as files on an internal storage or an external storage, as will be explained in more detail below. The files stored by the monitored communication server 206 can be stored indefinitely for use by the monitoring center 140 in monitoring and investigation of an inmate.

The non-monitored communication server 208 consists of any number of servers, and is configured to control the routing of communications to an end destination but bypasses the monitoring center 140. In doing so, the non-monitored communication server 208 performs switching required to electrically connect to a party, when receiving communications, and connect to another party, when transmitting communications. The non-monitored communication server 208 is configured to store non-real time communications, but not real time communications, as files on an internal storage or an external storage, as will be explained in more detail below. In comparison with the monitored communication server 206, the non-monitored communication server 208 only temporarily stores the non-real time communications until a predetermined time and/or predetermined event occurs, as described below. Further, communication information is not logged or recorded by the non-monitored communication server 208.

In an embodiment, the monitored communication server 206 and the non-monitored communication server 208 are each configured to transmit a second audible, visual, or text notification to a communication device to indicate that a communication is currently being routed by way of respective communication server 206 or 208. This second notification provides confirmation to the user that a communication is in fact being transmitted by way of a monitored or non-monitored communication path.

By completely separating and isolating the monitored communication server 206 and the non-monitored communication server 208 from each other, there is no error or chance of recording a privileged communication as in conventional monitoring systems.

Because there may be a variety of different communication standards employed by different audio, video, image, and text devices that wish to participate in communications, in an embodiment, both the monitored communication server 206 and the non-monitored communication server 208 are also configured to perform format conversion of non-real time communications. Conversion of incoming and outgoing communications are performed, as needed, to be compatible with the inmate communication device 120, the outsider communication device 130, or the monitoring center 140 (in the case of the monitored communication server 206). For example, the non-monitored communication server can convert an audio communication received from the audio communication device 123*a* such that an outsider can listen to the audio communication by way of one or more of the work station 132, the basic telephone 134, or the wireless communication device 136.

Further, because the monitored communication server 206 and the non-monitored communication server 208 receive and transmit communications by way of a network, in an exemplary embodiment, the monitored communication server 206 and the non-monitored communication server 208 are configured to decrypt received communications and encrypt transmitting communications, for security purposes.

The database server 210 consists of any number of servers, and is configured to store and organize data in a relational database. The database server 210 is configured to run a database management system, such as MYSQL™, to provide an example. The databases server 210 organizes the data such that respective identity data, portal data, and PINs are indexed and linked to allow communications to be routed by way of the monitored communication server 206 or the non-monitored communication server 208.

The web server 212 consists of any number of servers, and is configured to run web server software such as Apache and/or Microsoft Internet Information Server and/or an interactive voice response (IVR) server software. The primary function of the web server 212 is to route requests and other communications from inmate communication device 120 or the outsider communication device 130 to an appropriate destination within the communication system 100. In an embodiment, the web server 212 also serve as a maintenance point into the communication center 110, by which servicing, configuring, and updating can be performed. In an embodiment, the web server 212 is connected to both the public Internet and the internal network of the facility. In an embodiment, the web server 212 can provide managing services for generating communications, receiving instructions from a party to send or receive communications, and coordinating the transmission of communications. For example, the web server 212 can facilitate a party in generating a non-real time communication when the party uses a front-end application having a user interface.

The data storage 220 provides access to a wide variety of data such as identity data of parties involved in the transmitting and receiving of communications, identity data, portal data, contact data, account data, and/or database data. In general, the data storage 220 stores any data stored by the identity server 202, the portal server 204, the monitored communication server 206, the database server 210, the web server 212, and the application server 214. However, in order to retain the confidentiality of a privileged communication, the data storage 220 completely isolates non-monitored communications from monitored communications, or the non-monitored communications are stored by other means.

Because the data stored on the data storage 220 may consume a significant amounts of storage space, the data storage 220 may include a Network Attached Storage (NAS) device, which is configured as a mass storage device. In order to reduce the required size of the data storage 220, the data storage 220 preferably includes a backup routine to transfer data to permanent storage devices, such as archival permanent storage or optical disks, after a predetermined time has elapsed since the initial recording of that data.

Figure 3:
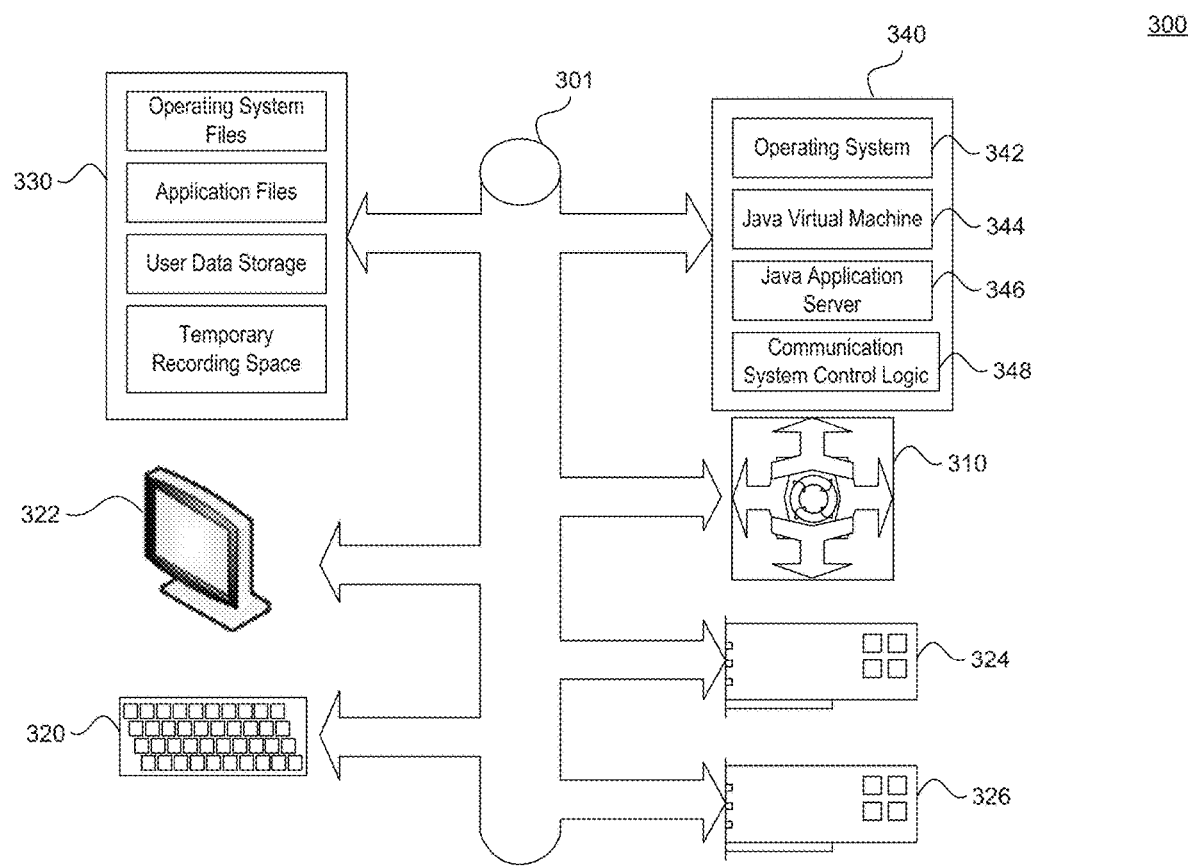
FIG. 3 illustrates an application server, according to exemplary embodiments of the present disclosure.

FIG. 3 illustrates an application server 300, according to exemplary embodiments of the present disclosure. The application server 300 may represent an exemplary embodiment of the application server 214 depicted in FIG. 2. The application server 300 consists of any number of servers, and functions as the primary logic processing center in the communication system 100. The application server 300 is configured to manage and facilitate communication between the an identity server 202, a portal server 204, a monitored communication server 206, a non-monitored communication server 208, a database server 210, a web server 212, and the data storage 220.

The application server 300 includes one or more central processing units (CPU) 310 connected via a bus 301 to several other peripherals. Such peripherals include an input device, such as a keyboard and/or mouse 320, a monitor 322 for displaying information, a network interface card 324 and/or a modem 326 that provide network connectivity and communication.

The application server 300 also includes internal data storage 330. This data storage 330 is non-volatile storage, such as one or more magnetic hard disk drives (HDDs) and/or one or more solid state drives (SSDs). The data storage 330 is used to store a variety of important files, documents, or other digital information, such as the operating system files, application files, user data, and/or temporary recording space.

The application server 300 also includes system memory 340. The system memory 340 is preferably faster and more efficient than the data storage 330, and is configured as random access memory (RAM) in an embodiment. The system memory 340 contains the runtime environment of the application server, storing temporary data for any of the operating system 342, java virtual machine 344, java application server 346, and communication control logic 348.

System Operation

Operations of communicating with an inmate in a privileged communication by the communication system 100 will be described with respect to FIGS. 4 and 5. Although the physical devices and components that form the system have largely already been described, additional details regarding their more nuanced operation will be described below with respect to FIGS. 1-3. While FIGS. 4 and 5 contain methods of operation of the communication system 100, the operations are not limited to the order described below, and various operations can be performed in a different order. Further, two or more operations of each method can be performed simultaneously with each other.

The communication system 100 provides communications between a variety of different devices. For starters, regardless of the communication type, all communications to/from an inmate communication device are transported by way of the communication center 110. In the case of traditional phones, because they are not connected directly to each other, the communication center 110 is configured to provide line power and logical switching services.

A user interface such as a web site, the IVR, or another interface is managed by, or on behalf of, a correctional facility. The interface provides an interactive platform for users wanting to generate, transmit, and receive non-real time communications from/to the correctional facility. Accordingly, the interface's backend links to or communicates with the application server 214 via the web server 212.

In the following operations, examples of an interface will be explained. As will be understood by those skilled in the arts, embodiments of the interface may be a graphical interface or an IVR. In the case of an IVR, the interface would limit some of the operations described below to only audio communications.

Account Setup Operation

A user, either an inmate or an outsider, wishing to initiate or transmit a privileged communication must first register and set up an account with the communication center 100. The registry process requires the user to submit identity data, as previously described, to the communication system 100 in order to verify the user's identity to a high degree of likelihood. Registration can be either in-person or by communication device (e.g., 120 or 130), depending on correction facility rules. This is particularly important for security purposes, to ensure that the communication center 100 can properly vet an inmate and outsiders wishing to use the communication system 100 and verify that outsiders are people with whom an inmate has right to participate with in a privileged communication.

Once identity data has been submitted and verified, a user can setup an account. An account setup operation of a party using the communication center 100 will be described with respect to FIG. 4, which illustrates a flowchart diagram of a method 400 for setting up an account to use the communication center 100, according to exemplary embodiments of the present disclosure.

Figure 4:
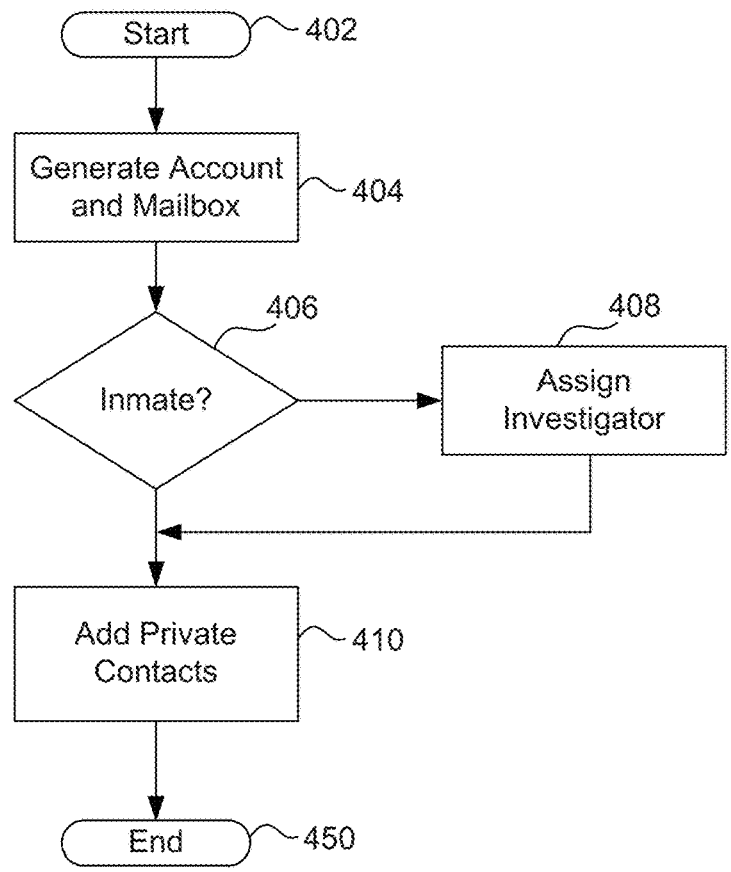
FIG. 4 illustrates a flowchart diagram of a method for setting up an account, according to exemplary embodiments of the present disclosure.

As shown by FIG. 4, an account setup process starts when a user attempts to setup an account through the communication system 100 (402). An attempt to setup an account may occur during registration or when the user first attempts to initiate a privileged communication through the communication system 100, such as the user attempting to access the communication system 100 for the first time.

Next, the user's account is automatically created (404). Creation of the user's account can include the user being assigned a PIN, a mailbox for receiving a non-real time communication, and/or the user selecting settings and preferences for receiving or transmitting a communication. The communication system 100, particularly the database server 210, assigns the user a unique account number used to index and link data associated with the user. The PIN is stored by the databases server 210 and used by the communication system 100 to quickly route a communication to the user. The mailbox is stored on the non-monitored server 208 and used to temporarily store non-real time communications. Next, an account setup process determines whether the user is an inmate (406). This determination is based on an identification verification procedure, which is explained in further detail below. If the user is an inmate, an investigator is assigned to the inmate (408). In this case, an investigator is someone assigned by the correctional facility or jurisdiction to receive, from an inmate, confidential information related to other inmates, officers, or crimes. The communication system 110 automatically assigns the investigator to the inmate. However, in an embodiment, the communication system 110 receives input from an administrator before assigning the investigator. If the user is not an inmate, or after the assignment of the investigator to an inmate, privileged contacts are added and assigned to the user (410). To add and assign privileged contacts, the user selects from a list of contacts that are already registered with the communication system 100. Additionally or alternatively, in an embodiment, the application server 214 is configured to retrieve contact data from the data storage 220 and extract information on contacts that are associated with the user. The contact data may include information that the user has previously submitted to the communication system 100, such as known doctors, attorneys, counselors, or non-inmate professionals authorized to register and communicate with the inmate. Non-inmate professionals may need jurisdictional approval in order to register with the system. Based on the extracted information, the communication center 110 then determines which contacts are already registered to use the communication system 100, and populates at least some of the privileged contacts for the user. The database server 210 then links the privileged contacts with the user's account. Next, the account setup process ends (450).

Communication Operation

Figure 5A:
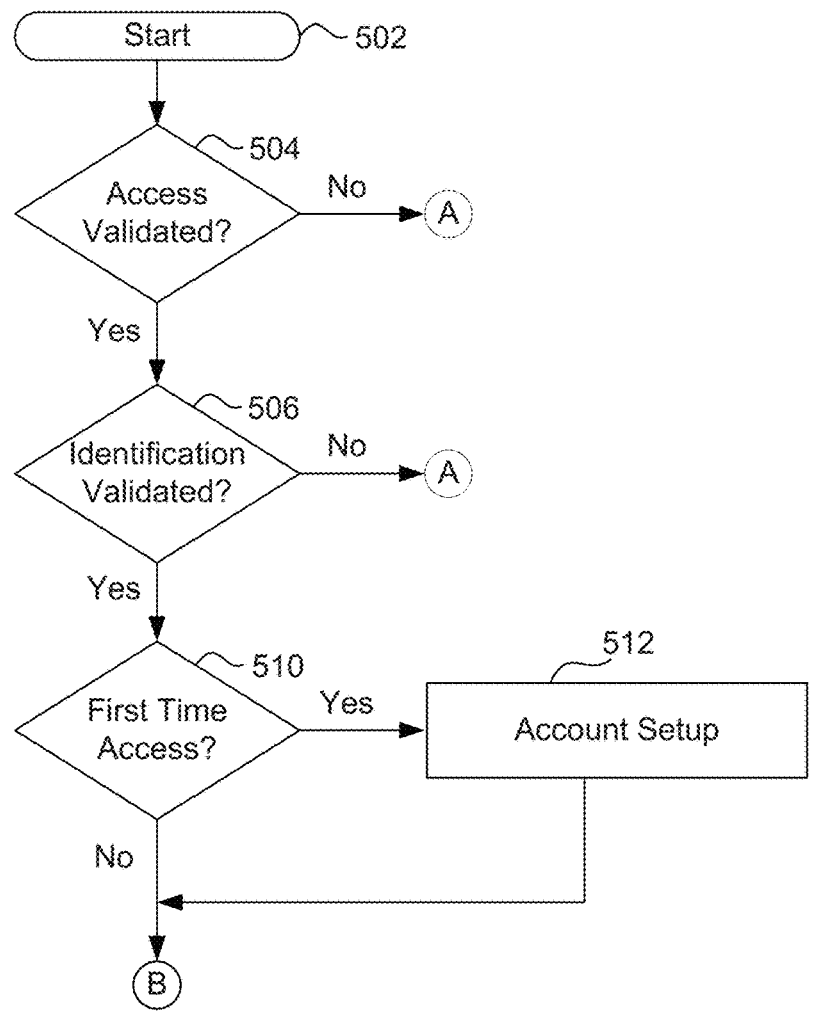
FIGS. 5A-5B illustrate a flowchart diagram of a method for generating a communication, according to exemplary embodiments of the present disclosure.
Figure 5B:
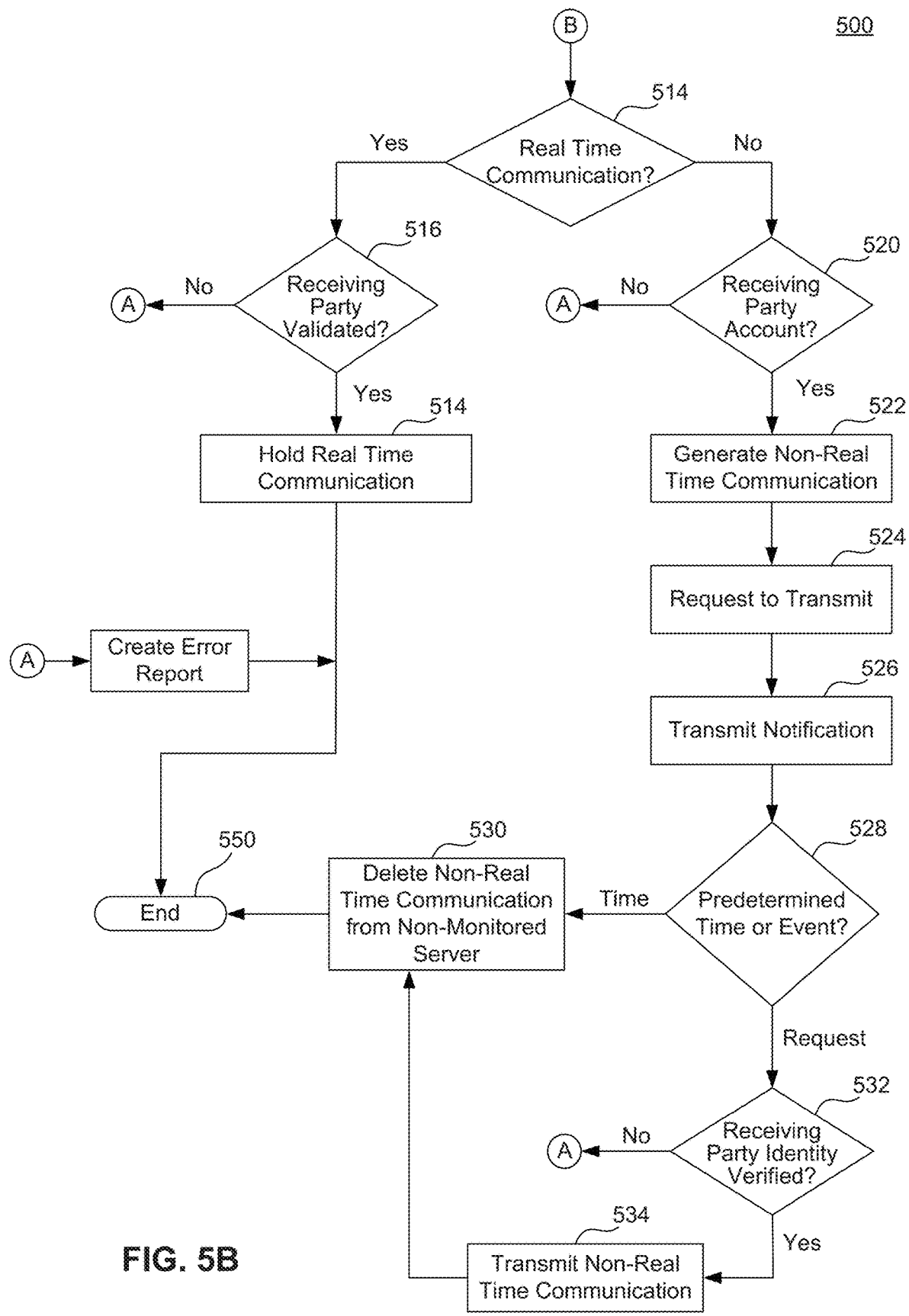

An operation of communicating in a privileged communication by a party using the communication system 100 will be described with respect to FIGS. 5A-5B, which illustrate a flowchart diagram of a method 500 for communicating in a privileged manner using the communication system 100, according to exemplary embodiments of the present disclosure.

Once registered, an operation of participating in a privileged communication starts when a user attempts to initiate a privileged communication through the communication system 100 (502). An attempt to initiate the privileged communication includes a user calling into or logging onto a website used by the communication system 100. An attempt to logon to the website occurs when the user enters a username and password at a website.

Once the communication center 110 recognizes that an attempt has occurred, the communication center 110 verifies access to the communication system 100 (504). This is done by verifying access information used to attempt to initiate the communication. The access information can include the phone number or the email address used by the user to attempt to initiate the communication. As an example, while using a communication device 120, if the user dials a phone number associated with an informant hotline, the communication system 100 can use the informant phone number as the access information to verify whether the communication should be monitored. The portal server 204 receives the access information and compares the received access information to portal data to determine the validity of the received access information. If the access information is not valid, the communication center 110 ends the privileged communication process (550). Otherwise, the privileged communication process transitions to performing an identity verification procedure to determine the authenticity of the purported user (506). To perform the identity verification procedure, the identity server 202 requests for identity information from a communication device (either 120 or 130) used by a purported user. Once received the identity server 202 compares the received identity information with stored identity data. If the received identity information does not match the stored identity data, the identity verification procedure has failed. As with all identity verification procedures described herein, upon a predetermined number of failed attempts to validate an identity, the purported user will be prohibited from accessing the communication center 110 (at least until the purported user can confirm their identity by some other way such as in-person, over the phone, or online confirmation, to unlock the user's account). If the communication center 110 is unable to validate an identity of the purported user, an error report is created (508). The error report is used by system administrators of the communication system 100 for troubleshooting whether the communication system 100 contains errors or whether the purported user is attempting to circumvent the identity verification process. After the error report is created, the communication center 110 ends the privileged communication process (550).

If the communication center 110 validates the identity of the purported user, the communication center 110 determines whether the user is accessing the communication system 100 for a first time (510). To determine whether the user is accessing the communication system 100 for the first time, the user data is compared against stored account data stored by the database server 210. In particular, the application server 214 verifies that the user has already set up an account with the communication system 100. If account data for the user has not been created, the user setups an account (512), as described by FIG. 4.

If an account has already been created or after the user creates an account, the communication center 110 determines whether the communication is a real-time communication (514). This is determined by the application server 214 based on a front-end application used at the communication device 120 or 130. For example, if the user is attempting to call an attorney, or vice versa, the caller may select a real time communication from the interface, either graphical interface or by way of IVR, of the communication device 120 or 130 to make a phone call. For real time communications, the communication center 110 performs an account verification procedure of the purported receiving user and an identity verification procedure of the purported receiving user to validate the receiving party (516). First, the portal server 204 verifies that the receiving party has an account to communicate via the communication system 100 by comparing identity data with portal data. In an embodiment, if the user has not provided sufficient information for the portal server 204 to determine who the receiving party is, the portal server 204 sends a request for more data to the communication device 120 or 130. The request for more data includes a request for a PIN, an extension number of the receiving party, a voice prompt, and/or an access code. Once the additional information is received from the communication device 120 or 130, the portal server 204 then verifies that the receiving party has an account with the communication system 100. Second, if the receiving party has an account, portal server 204 allows the identity server 202 to perform an identity verification procedure by obtaining identity information from the purported receiving user and comparing it to identity data, similar to the previously described identity verification procedure (see e.g., 506). If the communication center 110 is unable to validate an account or an identity of the receiving party, an error report is created (508), as previously described. After the error report is created, the communication center 110 ends the privileged communication process (550). Otherwise, the non-monitored communication server 208 allows the parties to hold a real time communication (518). The non-monitored communication server 208 facilitates the real time communication until one of the parties disconnects to end the privileged communication process (550).

If the communication center 110 determines that the communication is a non-real time communication, such as a text or voicemail, the communication center 110 performs an account verification procedure of the purported receiving user to validate the receiving party (520). An account verification procedure is performed by the portal server 204 to verify that the receiving party has an account to communicate via the communication system 100 by comparing identity data with portal data, as previously described above (see e.g., 516). An identity verification process is not needed at this time, as the receiving parties identity is verified at the time of retrieving the communication. If the receiving party has an account with the communication system 100, the portal server 204 allows the user to generate a non-real time communication (522). The non-real time communication is created by way of the interface such as a texting application on the communication device 120 or 130 or a voicemail created through the IVR. Once generated, a request to transmitted from the communication device 120 or 130 to the non-monitored communication server 208 (524). The request to transmit can be message from the communication device 120 or 130 indicating that the user selected, by way of the interface, to have the generated non-real time communication transmitted to the receiving party. For non-real time communications generated on a texting interface, the non-monitored communication server 208 requests for and receives the generated non-real time communication from the communication device 120 or 130 and then temporarily stores the non-real time communication. For non-real time communications generated by way of the IVR, the non-real time communication is automatically stored by the non-monitored communication server 208.

Next, a notification indicating that the generated non-real time communication is available for retrieval is generated and transmitted by the application server 214 to a receiving communication device 120 or 130 (526). After the notification has been transmitted, the portal server 204 starts a timer and monitors the timer to determine whether a predetermined time has occurred since the notification was transmitted or a request to transmit the generated non-real time communication has been received (528). If the predetermined time has occurred before a request to transmit the generated non-real time communication has been received from the receiving communication device 120 or 130, the generated non-real time communication is automatically deleted from the non-monitored communication server 208 (530), and the communication center 110 ends the privileged communication process (550). For example, the generated non-real time communication may be automatically deleted from the non-monitored communication server 208 after a number of days have passed since the notification was transmitted to the receiving communication device 120 or 130.

If a request to transmit the generated non-real time communication is transmitted by the receiving communication device 120 or 130 to the communication center 110 before the predetermined time has occurred, the portal server 204 allows the identity server 202 to request for identity information from the receiving communication device 120 or 130 used by a purported receiving party and performs an identity verification process (532), as previously described. If the identity server 202 is unable to validate an identity of the purported user, an error report is created (508), and the communication center 110 ends the privileged communication process (550). Otherwise, the non-monitored communication server 208 transmits the generated non-real time communication to the receiving communication device 120 or 130 (534). Next, the generated non-real time communication is automatically deleted from the non-monitored communication server 208 (530), and the communication center 110 ends the privileged communication process (550).

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
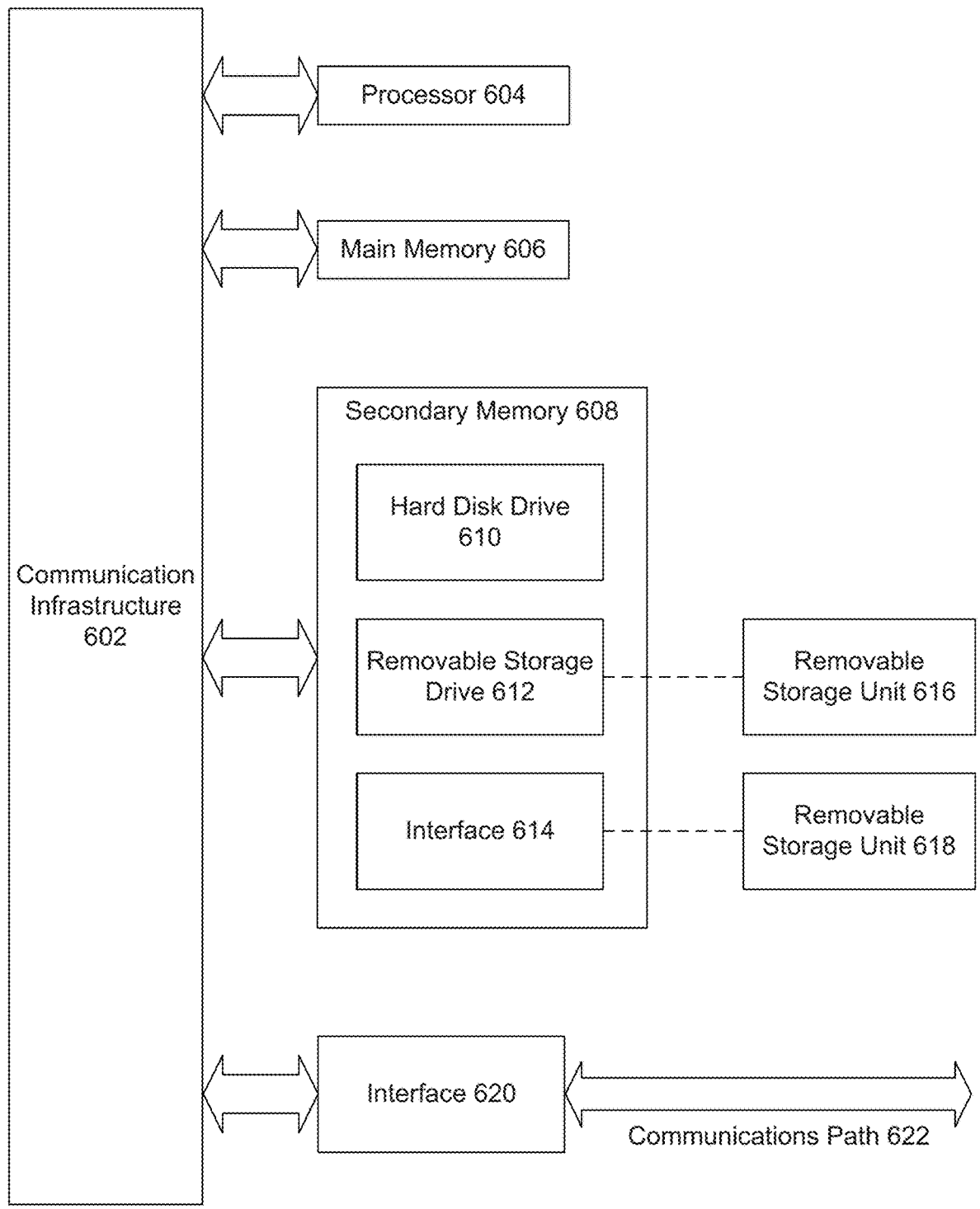
FIG. 6 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4 and 5A-5B can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A system comprising:
   a communication subsystem comprising a monitoring server and a non-monitoring server wherein the monitoring server is physically isolated from the non-monitoring server; and
   a portal subsystem configured to:
   receive a first access information from a first user using a first communication device;
   determine whether the first user is authorized to participate in a requested attorney-client communication, the requested attorney-client communication being covered under legal rights that preclude monitoring by law enforcement;
   transmit a request for a second access information to the first communication device in response to determining that the first user is authorized to participate in the requested attorney-client communication;
   receive the second access information from the first communication device;
   determine an identity of a second user based on the second access information;
   determine whether the first user is authorized to participate in the requested attorney-client communication with the second user based on the second access information; and
   route the requested attorney-client communication between the first communication device and a second communication device associated with the second user by way of the non-monitoring server in response to determining that the first user is authorized to participate in the requested attorney-client communication with the second user.

2. The system of claim 1, wherein the first user or the second user is a legal professional.

3. The system of claim 1, wherein the first access information includes one or more of a first phone number or a first email address.

4. The system of claim 1, wherein the second access information includes one or more of a personal identification number (PIN), a voice prompt, a second phone number, or a selection on an interface of the first communication device by the first user.

5. The system of claim 1, further comprising an identity subsystem configured to collect and store identity data for a plurality of users.

6. The system of claim 5, wherein to determine the identity of the second user and to determine whether the first user is authorized to participate in the requested attorney-client communication with the second user, the portal system is further configured to:

access account data for the first user in the portal subsystem, wherein the account data indicates that the first user is authorized to participate in the requested attorney-client communication with the second user; and
perform an identity verification to authenticate the identity of the second user with the identity data stored in the identity subsystem.

7. The system of claim 1, wherein the portal subsystem is further configured to:
transmit a notification to the first communication device and the second communication device, wherein the notification indicates that the requested attorney-client communication is not being monitored.

8. The system of claim 7, wherein the notification comprises at least one of an audible, visual, or text notification.

9. The system of claim 1, wherein the portal subsystem is further configured to:
route the requested attorney-client communication between the first communication device and the second communication device by way of the monitoring server in response to determining that the first user is not authorized to participate in the requested attorney-client communication with the second user.

10. The system of claim 9, wherein the portal subsystem is further configured to:
transmit a notification to the first communication device and the second communication device, wherein the notification indicates that the requested attorney-client communication is to be monitored; and
receive, from the first communication device or the second communication device, an indication by the first user or the second user acknowledging that the requested attorney-client communication is to be monitored when the first user is not authorized to participate in the requested attorney-client communication with the second user.

11. A method comprising:
receiving a first access information from a first user using a first communication device;
determining whether the first user is authorized to participate in a requested attorney-client communication;
transmitting a request for a second access information to the first communication device in response to determining that the first user is authorized to participate in the requested attorney-client communication;
receiving the second access information from the first communication device;
determining an identity of a second user based on the second access information;
determining whether the first user is authorized to participate in the requested attorney-client communication with the second user based on the second access information;
in response to determining that the first user is authorized to participate in the requested attorney-client communication with the second user, routing the requested attorney-client communication between the first communication device and a second communication device associated with the second user by way of a non-monitoring server; and
in response to determining that the first user is not authorized to participate in the requested attorney-client communication with the second user, routing the requested attorney-client communication between the first communication device and the second communication device associated with the second user by way of a monitoring server, wherein the monitoring server is physically isolated from the non-monitoring server.

12. The method of claim 11, wherein the first access information includes one or more of a first phone number or a first email address.

13. The method of claim 11, wherein the second access information includes one or more of a personal identification number (PIN), a voice prompt, a second phone number, or a selection on an interface of the first communication device by the first user.

14. The method of claim 11, further comprising:
collecting identity data for a plurality of users; and
storing the identity data in a database server.

15. The method of claim 14, wherein determining the identity of the second user and determining whether the first user is authorized to participate in the requested attorney-client communication with the second user comprises:
accessing account data for the first user in the database server, wherein the account data indicates that the first user is authorized to participate in the requested attorney-client communication with the second user; and
performing an identity verification to authenticate the identity of the second user with the identity data stored in the database server.

16. The method of claim 11, further comprising:
in response to determining that the first user is authorized to participate in the requested attorney-client communication with the second user, transmitting a notification to the first communication device and the second communication device, wherein the notification indicates that the requested attorney-client communication is not being monitored.

17. The method of claim 16, wherein the notification comprises at least one of an audible, visual, or text notification.

18. The method of claim 11, further comprising:
receiving, from the first communication device or the second communication device, an indication acknowledging that the requested attorney-client communication is to be monitored when the first user is not authorized to participate in the requested attorney-client communication with the second user.

19. The method of claim 11, further comprising:
in response to determining that the first user is not authorized to participate in the requested attorney-client communication with the second user, transmitting a notification to the first communication device and the second communication device, wherein the notification indicates that the requested attorney-client communication is being monitored.

20. The method of claim 19, wherein the notification comprises at least one of an audible, visual, or text notification.

* * * * *